United States Patent
Marianetti, II et al.

(10) Patent No.: US 6,567,549 B1
(45) Date of Patent: *May 20, 2003

(54) METHOD AND APPARATUS FOR IMMEDIATE RESPONSE HANDWRITING RECOGNITION SYSTEM THAT HANDLES MULTIPLE CHARACTER SETS

(75) Inventors: Ronald Marianetti, II, Morgan Hill, CA (US); Robert Yuji Haitani, Cupertino, CA (US)

(73) Assignee: PalmSource Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,603

(22) Filed: Sep. 14, 2000

Related U.S. Application Data (63) Continuation of application No. 09/255,200, filed on Jan. 5, 1999, now Pat. No. 6,188,789, which is a continuation of application No. 08/760,709, filed on Dec. 5, 1996, now Pat. No. 5,889,888.

(51) Int. Cl.[7] .................................................. G06K 9/00
(52) U.S. Cl. ....................................... 382/189; 382/188
(58) Field of Search ................................ 382/185–189; 178/18.01, 18.03

(56) References Cited

U.S. PATENT DOCUMENTS

| | | |
|---|---|---|
| 3,199,078 A | 8/1965 | Gaffney, Jr. et al. |
| 3,835,453 A | 9/1974 | Narayanan ................ 340/146.3 |
| 3,996,557 A | 12/1976 | Donahey ................. 340/146.3 |
| 4,074,114 A | 2/1978 | Dobras ........................ 235/463 |
| 4,241,409 A | 12/1980 | Nolf ............................ 364/705 |
| 4,400,697 A | 8/1983 | Currie et al. ................ 340/711 |
| 4,531,231 A | 7/1985 | Crane et al. .................... 382/13 |
| 4,540,292 A | 9/1985 | Rubenstein et al. .......... 368/29 |
| 4,561,105 A | 12/1985 | Crane et al. .................... 382/13 |
| 4,724,285 A | 2/1988 | Lefler et al. ................... 178/21 |
| 4,730,186 A | 3/1988 | Koga et al. ................. 345/179 |
| 4,731,811 A | 3/1988 | Dubas ........................... 379/58 |
| 4,795,349 A | 1/1989 | Sprague et al. ............. 434/156 |

(List continued on next page.)

FOREIGN PATENT DOCUMENTS

| | | | |
|---|---|---|---|
| DE | 3912225 | 10/1989 | .......... G06K/11/86 |
| DE | 3927372 | 2/1991 | ............. G06F/3/00 |
| EP | 0 538 705 A1 | 4/1983 | ........... G06F/3/033 |

(List continued on next page.)

OTHER PUBLICATIONS

Microsoft Corporation Users Guide entitled: Microsoft Windows for Pen Computing, Version 1.0, 1992, Grid, pp. 1–43.
Newton Users Guide entitled: MessagePad Handbook, Apple Computer, Inc., Chap. 2, pp. 5–39, 1993.

(List continued on next page.)

Primary Examiner—Yon J. Couso
(74) Attorney, Agent, or Firm—Van Mahamedi; Hickman Palermo Troung & Becker LLP (57) ABSTRACT

To efficiently recognize characters from several character sets, a palmtop computer system is disclosed wherein more that one character input area is displayed. Each character input area is designed to recognize strokes that represent characters from a different character set. In one embodiment, the palmtop computer system has an alphabetic input area and a numeral input area. In such an embodiment, strokes entered in the alphabetic input area are interpreted as alphabetic characters and strokes entered in the numeral input area are interpreted as numerals.

12 Claims, 7 Drawing Sheets

U.S. PATENT DOCUMENTS

| | | | |
|---|---|---|---|
| 4,837,797 A | 6/1989 | Freeny, Jr. | 379/96 |
| 4,856,820 A | 8/1989 | Kasprzak et al. | 283/81 |
| 4,860,372 A | 8/1989 | Kuzunuki et al. | 382/189 |
| 4,866,257 A | 9/1989 | Elliott et al. | 235/436 |
| 4,883,291 A | 11/1989 | Robertson | 283/117 |
| 4,972,496 A | 11/1990 | Sklarew | 382/187 |
| 4,985,929 A | 1/1991 | Tsuyama | 382/48 |
| 5,022,086 A | 6/1991 | Crane et al. | 382/2 |
| 5,050,121 A | 9/1991 | Vaughan | 364/900 |
| 5,097,425 A | 3/1992 | Baker et al. | 395/2 |
| 5,125,039 A | 6/1992 | Hawkins | 382/30 |
| 5,128,672 A | 7/1992 | Kaehler | 341/23 |
| 5,140,645 A | 8/1992 | Whitaker | 382/11 |
| 5,150,424 A | 9/1992 | Aguro et al. | 382/13 |
| 5,157,737 A | 10/1992 | Sklarew | 382/13 |
| 5,159,321 A | 10/1992 | Masaki et al. | 345/179 |
| 5,191,622 A | 3/1993 | Shojima et al. | 382/13 |
| 5,194,852 A | 3/1993 | More et al. | 340/712 |
| 5,197,810 A | 3/1993 | Zhang et al. | 400/110 |
| 5,231,381 A | 7/1993 | Duwaer | 178/18.03 |
| 5,267,327 A | 11/1993 | Hirayama | 382/13 |
| 5,274,198 A | 12/1993 | Landmeier | 178/18 |
| 5,297,041 A | 3/1994 | Kushler et al. | 364/419.95 |
| 5,305,394 A | 4/1994 | Tanaka | 382/18 |
| 5,313,527 A | 5/1994 | Guberman et al. | 382/13 |
| 5,329,578 A | 7/1994 | Brennan et al. | 379/67 |
| 5,367,558 A | 11/1994 | Gillig et al. | 379/59 |
| 5,389,745 A | 2/1995 | Sakamoto | 178/18 |
| 5,392,390 A | 2/1995 | Crozier | 395/161 |
| 5,398,115 A | 3/1995 | Lin | 358/407 |
| 5,410,612 A | 4/1995 | Arai et al. | 382/187 |
| 5,434,929 A | 7/1995 | Beernick et al. | 382/187 |
| 5,444,192 A | 8/1995 | Shetye et al. | 178/18 |
| 5,452,371 A | 9/1995 | Bozinovic | 382/187 |
| 5,459,796 A | 10/1995 | Boyer | 382/187 |
| 5,500,859 A | 3/1996 | Sharma et al. | 370/81 |
| 5,511,111 A | 4/1996 | Serbetcioglu et al. | 379/67 |
| 5,523,775 A | 6/1996 | Capps | 178/18 |
| 5,528,743 A | 6/1996 | Tou et al. | 395/148 |
| 5,534,892 A | 7/1996 | Tagawa | 345/173 |
| 5,615,284 A | 3/1997 | Rhyne et al. | 382/187 |
| 5,621,817 A | 4/1997 | Bozinovic et al. | 382/187 |
| 5,644,628 A | 7/1997 | Schwarzer et al. | 178/18.01 |
| 5,666,139 A | 9/1997 | Thielens et al. | 382/189 |
| 5,666,438 A | 9/1997 | Beernick et al. | 382/187 |
| 5,698,822 A | 12/1997 | Haneda et al. | 345/179 |
| 5,732,152 A | 3/1998 | Sakai et al. | 382/189 |
| 5,781,663 A | 7/1998 | Sakaguchi et al. | 382/189 |
| 5,838,820 A | 11/1998 | Bergman | 382/187 |
| 5,841,901 A | 11/1998 | Arai et al. | 382/187 |
| 5,881,169 A | 3/1999 | Henry, Jr. | 382/187 |
| 5,889,888 A | 3/1999 | Marianetti, II et al. | 382/187 |
| 6,188,789 B1 * | 2/2001 | Marianetti, II et al. | 382/189 |
| 6,493,464 B1 | 12/2002 | Hawkins et al. | 382/189 |

FOREIGN PATENT DOCUMENTS

| | | | | |
|---|---|---|---|---|
| EP | 0 107 196 A2 | 5/1984 | | G06K/9/22 |
| EP | 0 120 481 A2 | 10/1984 | | G06K/9/62 |
| EP | 0 135 615 A2 | 4/1985 | | G06K/9/62 |
| EP | 0 243 925 B1 | 11/1987 | | G06F/3/033 |
| EP | 0 243 925 A2 | 11/1987 | | G06F/3/033 |
| EP | 0 254 561 A2 | 1/1988 | | G06F/3/02 |
| EP | 0 114 250 B1 | 2/1992 | | G06K/9/62 |
| EP | 0 538 705 A1 | 4/1993 | | G06F/3/033 |
| EP | 0 572 031 A1 | 12/1993 | | G06F/3/033 |
| EP | 0 107 196 A2 | 5/1994 | | G06K/9/22 |
| EP | 0 598 236 A1 | 5/1994 | | G06F/3/033 |
| EP | 0 598 402 A1 | 5/1994 | | G06F/3/033 |
| EP | 0 607 926 A2 | 7/1994 | | G06F/3/033 |
| EP | 0 660 218 A1 | 6/1995 | | G06F/3/003 |
| EP | 0 661 619 A1 | 7/1995 | | G06F/3/033 |
| EP | 0 661 620 A1 | 7/1995 | | G06F/3/033 |
| EP | 0 665 506 A2 | 8/1995 | | G06K/9/62 |
| EP | 0 667 567 A2 | 8/1995 | | G06F/3/033 |
| WO | WO 92/08183 | 5/1992 | | G06F/3/033 |
| WO | WO 94/17468 | 8/1994 | | G06F/3/033 |
| WO | Wo 94/22109 | 9/1994 | | G06K/9/62 |

OTHER PUBLICATIONS

Newton Users Guide entitled: MessagePad 100 Setup and Handwriting Guide, Apple Computer, Inc., Chap. 2, pp. 11–26, 1994.

PalmTop PTC–300/310 Users Guide, Sony, pp. 140–153, 1991.

Xtend PN10 Users Guide, Toshiba, pp. 35–73, 1993.

Computer User's Guide entitled: GRiDPAD, Chapter 10, pp. 10–1–10–17, Aug. 1990.

R. H. Davis, et al., "Recognition of handwritten characters—a review," Nov. 1986, *Image and Vision Computing*, p.p. 208–218.

PenPoint Brochure and Technical Specification, GO Corporation, 1992, Foster City, California.

"Pen Put—Beyond Character Recognition?," 2 pages, Organek Technology, Oakland, California, brochure.

David Goldberg, et al., "Touch–Typing with a Stylus," *Interchi '93 Conference Proceedings*, Apr. 24–29, 1993, pp. 80–87.

John J. Darragh, et al., "The Reactive Keyboard: A Predictive Typing Aid," Nov. 1990, *IEEE*, pp. 41–49.

David S. Doermann, et al., "Recovery of Temporal Information from Static Images of Handwriting," Unpublished paper from the Computer Vision Laboratory Center for Automation Research, University of Maryland, Dec. 1991.

T. Fujisaki, et al., "Online recognition of unconstrained handprinting: a stroke–based system and its evaluation," 1992, *From Pixels to Features III: Frontiers in Handwriting Recognition*, ed. S. Impedovo, et al., Elsevier Science Publishers, North–Holland, pp. 297–312.

David Goldberg, et al., "Stylus User Interfaces for Manipulating Text," Nov. 11–13, 1991, Unpublished Paper presented at UIST '91 in Hilton Head South Carolina from Xerox Palo Alto Research Center.

V. Govindaraju, et al., "Separating handwritten text from interfering strokes," 1992, From *Pixels to Features III: Frontiers in Handwriting Recognition,* ed. S. Impedovo, et al., Elsevier Science Publishers, North–Holland, pp. 17–28.

M. Hanan, et al., "Finite State Machine Decision Procedure Model for Signature Verification," Jan. 1978, *IBM Technical Disclosure Bulletin*, vol. 20, No. 8, pp. 3355–3360.

I. Guyon, et al., "Writer independent and writer adaptive neural network for online character recognition," 1992, *Pixels to Features III: Frontiers in Handwriting Recognition*, ed. S. Impedovo, et al., Elsevier Science Publishers, North–Holland, pp. 493–506.

C.A. Higgins, et al., "A new segmentation method for cursive script recognition", 1992, *Pixels to Features III: Frontiers in Handwriting Recognition*, ed. S. Impedovo, et al., Elsevier Science Publishers, North–Holland, pp. 75–86.

Khaled Kamel, et al., "A Computerized Transcription System For Curves Shorthand Writing," 1988, *IEEE*, pp. 336–339.

Joonki Kim, "Gesture Recognition by Feature Analysis," Dec. 30, 1986, Unpublished paper, from IBM Research Center, Yorktown Heights, New York, 10 pages.

J. M. Kurtzberg, et al., "Segmentation Procedure for Handwritten Symbols and Words," Dec. 1982, *IBM Technical Disclosure Bulletin*, vol. 25, No. 7B, pp. 3848–3852.

C. G. Leedham, et al., "On–line recognition of Pitman's handwritten shorthand—an evaluation of potential," 1986, *Int. J. Man–Machine Studies*, vol. 24, pp. 375–393.

J. S. Lew, "An Improved Regional Correlation Algorithm for Signature Verification Which Permits Small Speed Changes Between Handwriting Segments," Mar. 1983, *IBM J. Res. Develop.*, vol. 27, No. 2, pp. 181–185.

J. S. Lew, "Signature Verification Algorithm", Dec. 1982, *IBM Technical Disclosure Bulletin*, vol. 25, No. 78, pp. 3844–3847.

S. N. S. Rajasekaran, et al., "Recognition of Printed Telugu Characters," 1977, *Computer Graphics and Image Processing*, vol. 6., pp. 335–359.

C. C. Tappert, "Adaptive On–Line Handwriting Recognition," Proceedings of the IEEE Seventh International Conference on Pattern Recognition, Montreal, Canada, Jul. 30–Aug. 2, 1984, vol. 2, pp. 1004–1007.

C. C. Tappert, "Cursive Script Recognition by Elastic Matching," Nov. 1982, *IBM J. Res. Develop.*, vol. 26, No. 6, pp. 765–771.

C. C. Tappert, "On–Line Handwriting Recognition—A Survey," Dec. 8, 1987, Unpublished Research Report from IBM Research Division.

I. Yoshimura, et al., "On–line signature verification incorporating the direction of pen movement—An experimental examination of the effectiveness," 1992, *Pixels to Features III: Frontiers in Handwriting Recognition*, ed. S. Impedovo, et al., Elsevier Science Publishers, North–Holland, pp. 353–361.

A. Zahour, et al., "Machine Recognition of Arabic Cursive Writing," 1992, *Pixels to Features III: Frontiers in Handwriting Recognition*, ed. S. Impedovo, et al., Elsevier Science Publishers, North–Holland, pp. 289–296.

PenRight! Application User's Guide, Jul. 1992, GriD Systems Corporation, Order No. 039033–40, Revision D, Fremont, California.

"Progress in handwriting recognition", *What's News, Radio– Electronics*, Oct. 1990, p. 8.

J. F. Jarvis, "The Line Drawing Editor, an Experiment in Computer Vision", *AMC SIGGRAPH '76*, pp. 288–292.

C. C. Tappert, et al. "The State of the Art in On–Line Handwriting Recognition", *IEEE Transactions on Pattern Analysis and Machine Intelligence*, vol. 12, No. 8, Aug. 1990, pp. 787–808.

R. M. Carr, "Handwriting Recognition in the GO Operating System", IEEE document CH2961–1/91/0000/0483, pp. 483–486.

\* cited by examiner

| Letter | Stroke |
|---|---|
| A | ∧ |
| B | BB3 |
| C | C |
| D | bD |
| E | ε |
| F | ΓΓ |
| G | G6 |
| H | h |
| I | I |
| J | J |
| K | ≺ |
| L | L |
| M | mm |

| Letter | Stroke |
|---|---|
| N | N |
| O | OO |
| P | pp |
| Q | O |
| R | RR |
| S | S |
| T | ⌐ |
| U | U |
| V | VV |
| W | W |
| X | X⋋ |
| Y | Y Y |
| Z | Z |

Figure 1

| Number | Stroke |
|---|---|
| 0 | OO |
| 1 | I |
| 2 | 2 |
| 3 | 3 |
| 4 | L Z |

| Number | Stroke |
|---|---|
| 5 | 5 5 S |
| 6 | 6 |
| 7 | 7 |
| 8 | 8 8 |
| 9 | 9 |

| | | | | | | | | | |
|---|---|---|---|---|---|---|---|---|---|
| あ | a | い | i | う | u | え | e | お | o |
| か | ka | き | ki | く | ku | け | ke | こ | ko |
| が | ga | ぎ | gi | ぐ | gu | げ | ge | ご | go |
| さ | sa | し | si (shi) | す | su | せ | se | そ | so |
| ざ | za | じ | zi (ji) | ず | zu | ぜ | ze | ぞ | zo |
| た | ta | ち | ti (chi) | つ | tu (tsu) | て | te | と | to |
| だ | da | ぢ | di | づ | du | で | de | ど | do |
| な | na | に | ni | ぬ | nu | ね | ne | の | no |
| は | ha | ひ | hi | ふ | hu (fu) | へ | he | ほ | ho |
| ば | ba | び | bi | ぶ | bu | べ | be | ぼ | bo |
| ぱ | pa | ぴ | pi | ぷ | pu | ぺ | pe | ぽ | po |
| ま | ma | み | mi | む | mu | め | me | も | mo |
| や | ya | | | ゆ | yu | | | よ | yo |
| ら | ra | り | ri | る | ru | れ | re | ろ | ro |
| わ | wa | ゐ | wi | | | ゑ | we | を | wo |
| ん | n (nn) | | | | | | | | |

Figure 6a

| | | | | | | |
|---|---|---|---|---|---|---|
| きゃ | kya | きゅ | kyu | きょ | kyo |
| ぎゃ | gya | ぎゅ | gyu | ぎょ | gyo |
| しゃ | sya (sha) | しゅ | syu (shu) | しょ | syo (sho) |
| じゃ | zya (ja) | じゅ | zyu (ju) | じょ | zyo (jo) |
| ちゃ | tya (cha) | ちゅ | tyu (chu) | ちょ | tyo (cho) |
| ぢゃ | dya | ぢゅ | dyu | ぢょ | dyo |
| にゃ | nya | にゅ | nyu | にょ | nyo |
| ひゃ | hya | ひゅ | hyu | ひょ | hyo |
| びゃ | bya | びゅ | byu | びょ | byo |
| ぴゃ | pya | ぴゅ | pyu | ぴょ | pyo |
| みゃ | mya | みゅ | myu | みょ | myo |
| りゃ | rya | りゅ | ryu | りょ | ryo |

METHOD AND APPARATUS FOR IMMEDIATE RESPONSE HANDWRITING RECOGNITION SYSTEM THAT HANDLES MULTIPLE CHARACTER SETS

RELATED APPLICATIONS

This application is a continuation of U.S. patent application Ser. No. 09/255,200 filed Jan. 5, 2000, now issued as U.S. Pat. No. 6,188,789; which is a continuation of U.S. patent application Ser. No. 08/760,709 filed Dec. 5, 1996, now issued as U.S. Pat. No. 5,889,888; both of which are hereby incorporated by reference in this application.

FIELD OF THE INVENTION

The present invention relates to the field of palmtop computers and handwriting recognition systems. Specifically, the present invention discloses a handwriting input system that reduces the number of strokes to recognize a wide variety of different characters.

BACKGROUND OF THE INVENTION

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used to implement various Personal Information Management (PIM) applications such as an address book, a daily organizer, and electronic notepads.

Since palmtop computer systems are very small, keyboards are generally not efficient input devices. Palmtop computers with keyboards have keyboards that are so small that a user cannot touch-type. Furthermore, to use a keyboard a user must either place the palmtop computer system down onto a flat surface so the user can type with both hands or hold the palmtop computer system with two hands and type with thumbs only.

Instead of using a keyboard, many palmtop computers employ a pen and a digitizer pad as an input system. The pen and digitizer pad combination works well for palmtop computers since the arrangement allows a user to hold the palmtop computer system in one hand while writing with the pen onto the digitizer pad with the other hand.

A number of palmtop computer systems that rely on the pen and digitizer pad combination as the primary means of input have been introduced to the market. Most of these pen-based palmtop computer systems provide some type of handwriting recognition system whereby the user can write words and letters on the digitizer pad with a stylus. The palmtop computer system then converts the user's handwriting into a machine readable format such as ASCII code. Examples of pen-based palmtop computer systems that provide handwriting recognition include the Apple® Newton® and the Tandy® Zoomer™.

Consumer acceptance of pen based palmtop computer systems has been limited due to the poor performance of handwriting recognition systems. When a human reads a handwritten message, the human uses various clues to decipher the handwriting such as the known spelling of words, the known subject of the message, the writer's character writing style, and knowledge of English grammar. Since it is very difficult to teach a computer system all these subtle handwriting recognition heuristics, most handwriting recognition systems only rely on the writer's input strokes and a dictionary of common words. Using such limited information, such handwriting recognition systems often yield inaccurate results.

One method of simplifying the task of handwriting recognition is to divide the recognition task into identifying individual characters. This method is employed by the recognition system disclosed in the patent application titled "Multiple Pen Stroke Character Set and Handwriting Recognition System With Immediate Response" filed by Hawkins, et al. on Jul. 1, 1994, having Ser. No. 08/270,025. Using the immediate character recognition system disclosed in the Hawkins reference, a user can write as fast he wants and achieve nearly 100% recognition. However, systems constructed according to the Hawkins reference can only recognize a limited number of characters with out introducing confusing "mode change" strokes. It would therefore be desirable to have a computer system with a character recognition system that can recognize a large number of different characters with less effort on the user's part (i.e., fewer "mode change" strokes).

SUMMARY AND OBJECTS OF THE INVENTION

It is therefore an object of the present invention to design a recognition system that can extend the number of different characters without adding mode change strokes. This an other objectives are achieved by the multiple character set handwriting recognition system of the present invention.

To efficiently recognize characters from several character sets, a palmtop computer system is disclosed wherein more than one character input area is displayed. Each character input area is designed to recognize strokes that represent characters from a different character set. In one embodiment, the palmtop computer system has an alphabetic input area and a numeral input area. In such an embodiment, strokes entered in the alphabetic input area are interpreted as alphabetic characters and strokes entered in the numeral input area are interpreted as numerals.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for implementing a multi-character set handwriting recognition system are disclosed.

In the following description, for purposes of explanation, specific nomenclature is set forth to provide a thorough understanding of the present invention. However, it will be apparent to one skilled in the art that these specific details are not required to practice the present invention. In other instances, well-known circuits and devices are shown in block diagram form to avoid obscuring the present invention.

An Existing System

Pen based computer systems accept user handwriting for input. Handwriting recognition has proven to be a very difficult task. One method of simplifying the task of handwriting recognition is to split the handwriting into individual characters such that characters are written one by one. Then, each written character can be recognized individually. One embodiment of this recognition method is disclosed in the patent application titled "Multiple Pen Stroke Character Set and Handwriting Recognition System With Immediate Response" filed by Hawkins, et al. on Jul. 1, 1994, having Ser. No. 08/270,025.

Figure 1:
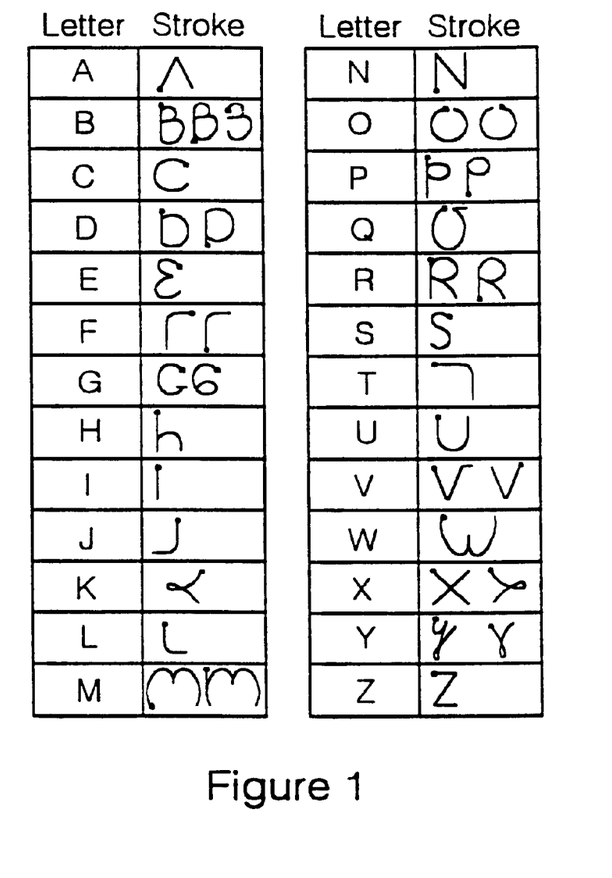
FIG. 1 illustrates the pen strokes used to represent the twenty-six letters of the ordinary English Alphabet.

FIG. 1 illustrates the different character strokes that are recognized as alphabetic character in the Hawkins patent. To enter the desired alphabetic letter, the user simply writes the appropriate character stroke. The dot indicates where the user begins the stroke.

Figure 2:
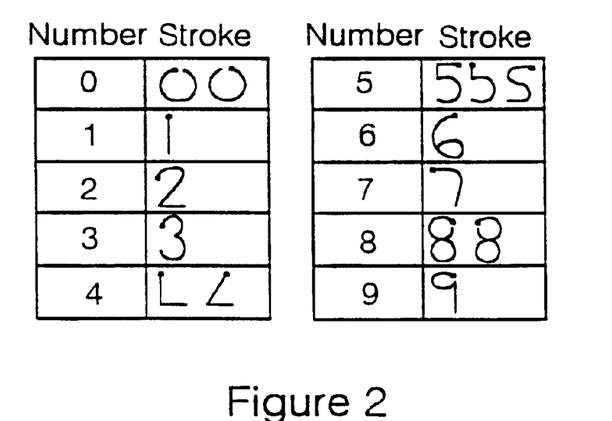
FIG. 2 illustrates the pen strokes used to represent the ten Arabic digits used in the English language.

FIG. 2 illustrates the different character strokes that are recognized as Arabic numbers in the Hawkins patent. To enter Arabic numbers, the Hawkins patent teaches a special "numeric mode." The numeric mode is required since several number characters are very similar to several alphabetic letter. Thus, the corresponding user input strokes are also very similar. Specifically, the "1" stroke is similar to the "I" stroke, the "2" stroke is similar to the "Z" stroke, the "5" stroke is similar to the "S", and so on. In the Hawkins patent, the user enters the numeric mode by tapping on an on-screen number icon or by entering a designated numeric lock stroke. (The numeric lock stroke in the Hawkins patent is a forward slash that is written from the bottom left to the top right.) Once the user is in the numeric mode, each successive stroke is interpreted as a numeric stroke as depicted in FIG. 2.

Numbers are often used in Personal Information Management (PIM) applications that are common in palmtop computer systems. Specifically, daily time organizers require numeric time of day input values and address books require numeric telephone numbers, street addresses, and ZIP codes. Therefore, it would be desirable to have a simple method of writing numbers. The numeric mode taught in the Hawkins patent is not ideal since it requires two extra strokes: an enter numeric mode stroke and an exit numeric mode stroke. Furthermore, numeric input in the Hawkins patent is implemented as a "mode" and user interface studies have shown that "modes" are often confusing to users.

The Numeric Input Box

To simplify the input of numbers, the present invention teaches using a separate numeric input box for entering Arabic numbers. The numeric input box is distinct from an alphabetic input box. By creating a distinct numeric input box, the ambiguities between a "1" stroke and an "I" stroke, a "2" stroke and a "Z" stroke, and a "5" stroke and an "S" stroke are not a problem since the recognition software will be attempting to recognize letters in the alphabetic input box and attempting to recognize numbers in the numeric input box.

Figure 3:
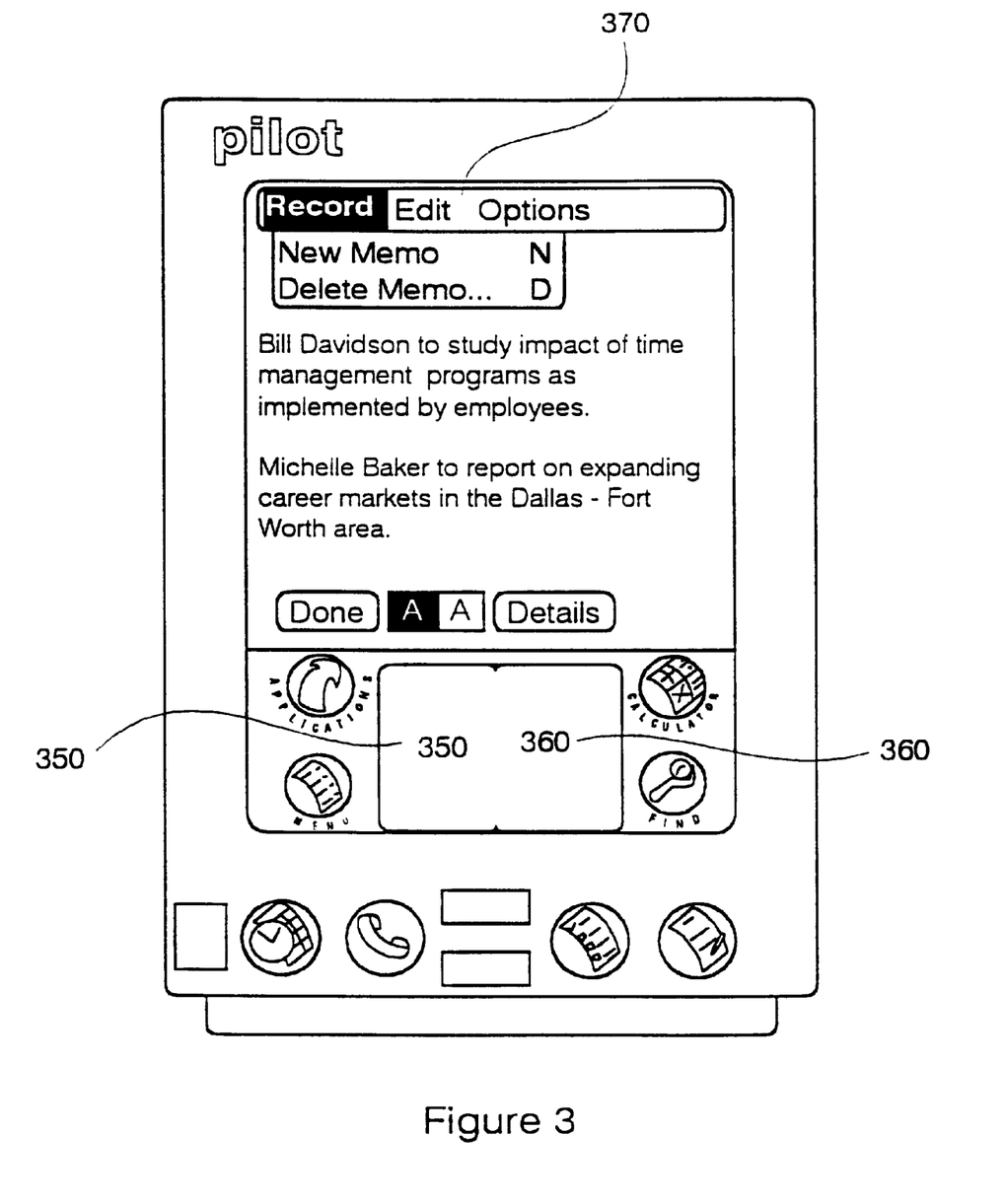
FIG. 3 illustrates a second embodiment of the pen-based computer system that uses separate alphabetic and numeric input boxes.

FIG. 3 illustrates a second embodiment of the two input box system. In the embodiment of FIG. 3, the alphabetic input box 350 and the numeric input box 360 are permanently designated areas.

As illustrated in the embodiment of FIG. 3, a pull-down menu 370 is displayed. The pull-down menu 370 includes two menu options "New Memo" and "Delete Memo" that may be selected to perform a corresponding operation. Each menu item has an associated command letter that can be used to invoke the pull-down menu option when given in conjunction with a command stroke. Specifically, "New Memo" has the command letter "N" and "Delete Memo" has the command letter "D". To invoke a menu option with the associated command letter, an advanced user enters a command stroke followed by the command letter of the desired menu option. The command stroke signifies that the next stroke should be interpreted as a command. In a preferred embodiment, the command stroke is the forward slash stroke (a stroke from the bottom left to the top right) that was previous used as a numeric mode stroke.

Foreign Characters

The present invention can be used to implement multiple character sets used in various foreign languages. For example, an embodiment designed for Eastern European and Russian languages could use three different character input boxes: one for roman characters, one for numerals, and one for Cyrillic characters. By using different input boxes, the task of the hand writing recognition engine is simplified. Furthermore, the number of strokes required from the user to produce a unique character in each different input area is reduced.

Figure 4:
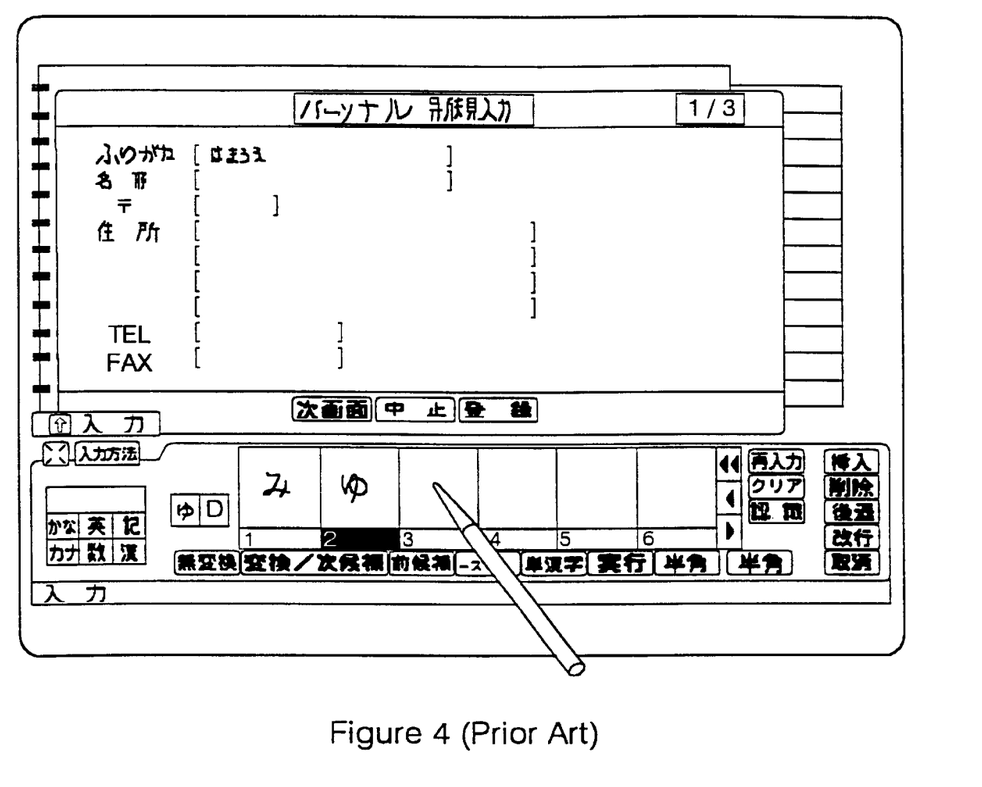
FIG. 4 illustrates a common prior art implementation of a Japanese writing recognition system.

Another particular interesting applications is Japanese since it uses a number of different character sets. The written Japanese language uses five different character sets: Kanji symbols, Hiragana characters, Katakana characters, Roman characters, and Arabic numerals. Prior art Japanese pen based computer systems usually use a complex front end processor to interpret handwritten characters. FIG. 4 illustrates a prior art Japanese pen based computer system. In the Japanese pen based computer system of FIG. 4, there are four successive input boxes. To write into the computer system of FIG. 4, a writer successively writes into the four input boxes. When the user begins to write into the next box, a previous box is interpreted by the character recognition system. Such Japanese writing recognition systems are often very slow due to the enormous number of possible characters that the recognition system must attempt to recognize.

Figure 5:
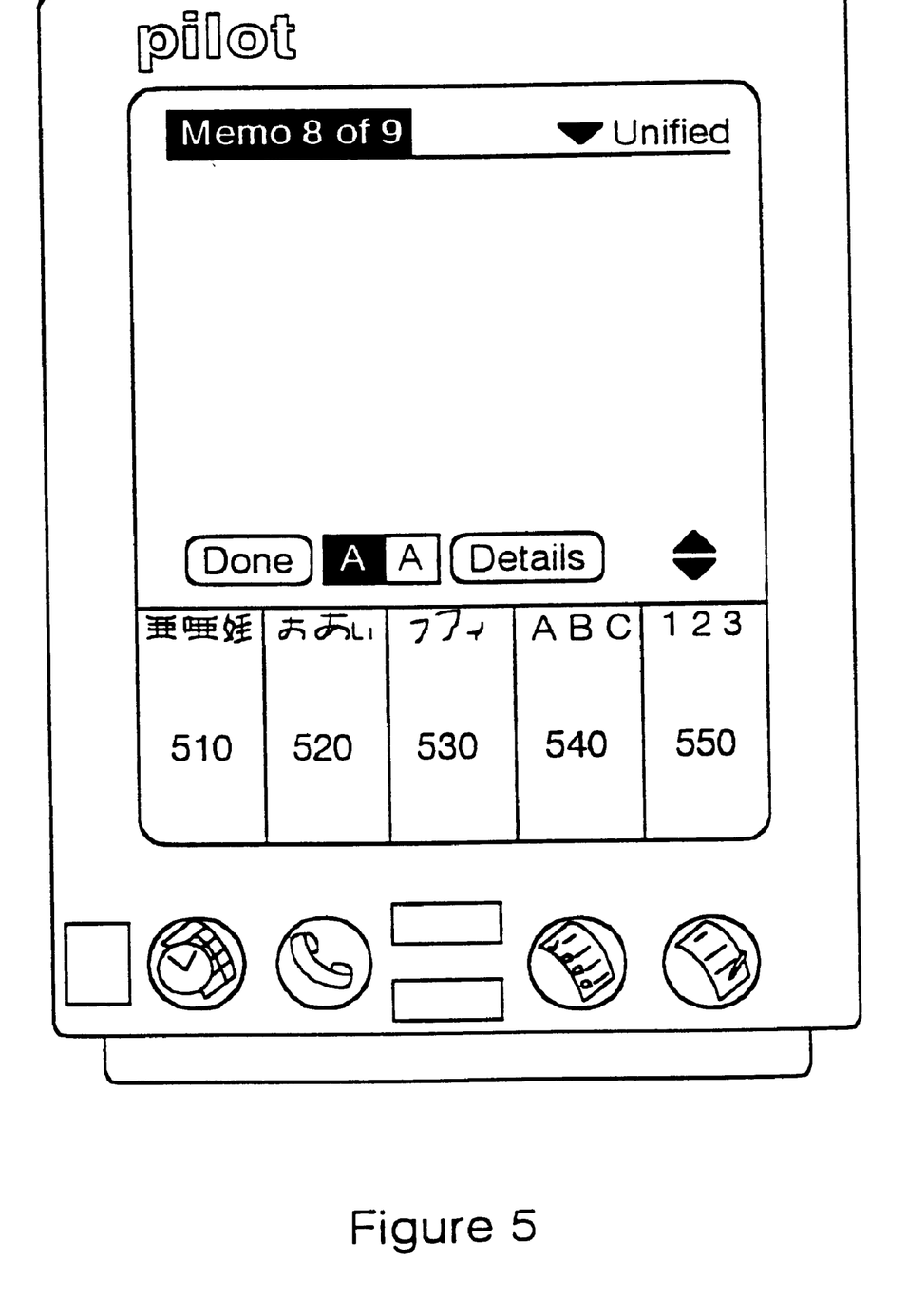
FIG. 5 illustrates an embodiment of a pen-based computer system that recognizes Japanese writing.

The present invention introduces a different method of entering Japanese text. In a first embodiment, each different type of character set could be assigned its own input box. FIG. 5 illustrates such an embodiment. Referring to FIG. 5, there is a Kanji input box 510, a Hiragana character input box 520, a Katakana character input box 530, a Roman character input box 540, and an Arabic numeral input box 550.

As set forth in the previous section, an immediate character recognition system could be used in the Roman character input box 540 and the Arabic numeral input box 550. The separate Roman character input box 540 and the Arabic numeral input box 550 resolve ambiguity problems for entering roman letters and Arabic numbers that have similar shapes.

To interpret complex Hiragana and Katakana characters, traditional character recognition systems could be used to recognize characters in the Hiragana character input box 520 and Katakana character input box 530 respectively. However, an immediate character recognition system could also be created for both the Hiragana and Katakana character sets. In such an embodiment, an immediate Hiragana character recognition system would be invoked when the user writes into the Hiragana character input box 520 and an immediate Katakana character recognition system would be invoked when the user writes into the Katakana character input box 530.

Figure 6A:
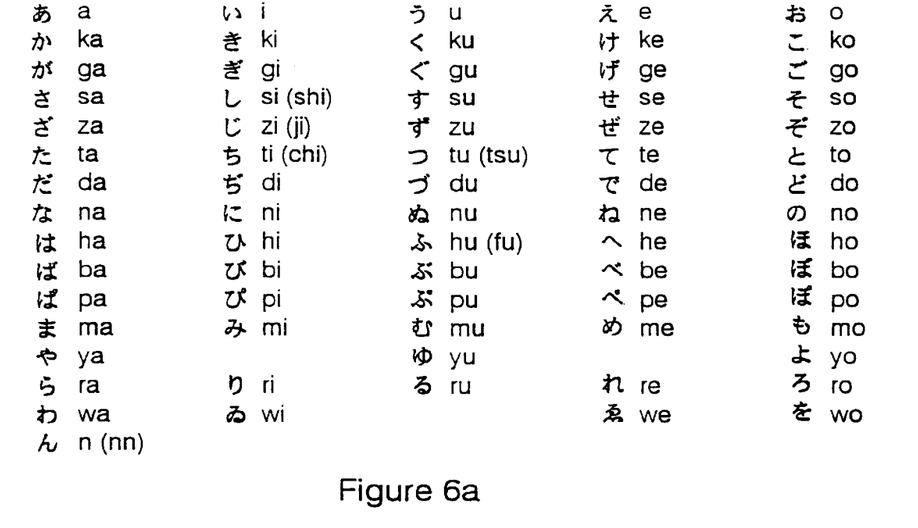
FIGS. 6a and 6b illustrate a romanized input system that accepts roman characters to input Japanese Hiragana.
Figure 6B:
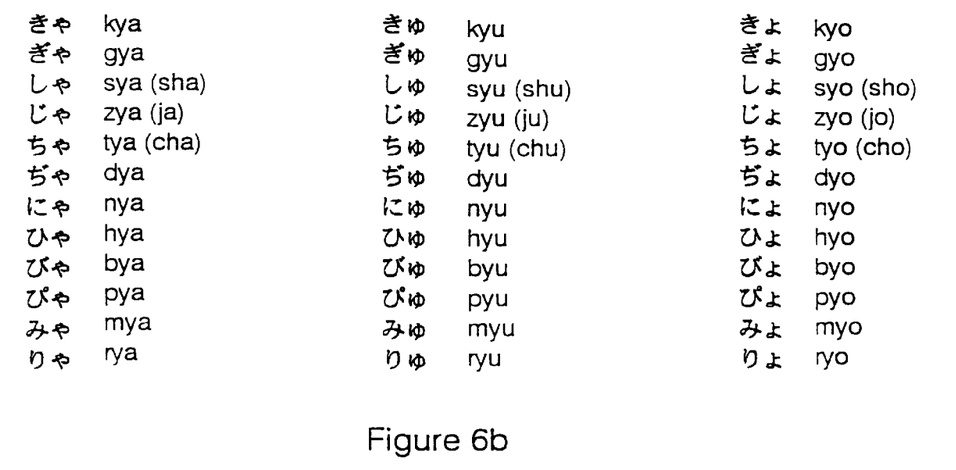

Alternatively, the Hiragana character input box 520 and the Katakana character input box 530 can be used to enter Hiragana and Katakana characters using Romanized input systems such as the "Romaji" system. With a romanized input system, the various Kana characters are entered by writing the roman letters that make the phonetic sound of the Kana character. For example, to enter the Hiragana for the word "sushi", the user writes the letters "su" to obtain a Hiragana character for the first syllable and then the user writes the letters "shi" to obtain the Hiragana character for the second syllable. FIGS. 6a and 6b illustrate a romanized phonetic sounds and the associated Japanese Hiragana. Using the romanized input system, the same stroke recognition system could be used by the Roman character input box 540, the Hiragana character input box 520, and the Katakana character input box 530.

There are too many Kanji symbols to create a simple fast immediate Kanji symbol input system. Thus, the Kanji input box 510 would likely be implemented as a traditional Kanji recognition system. In a traditional Kanji recognition system, the Kanji input box 510 would be used to draw the desired Kanji symbol. After drawing the desired Kanji symbol, the user would request the computer system to interpret the Kanji symbol and translated it into code.

Alternatively, the Kanji input box 510 could be used to enter the romanized phonetic equivalent of the desired Kanji symbol. As the user enters the romanized phonetic equivalent, the computer could display a list of candidate Kanji symbols that the user may be trying to generated. When the desired Kanji symbol is displayed, the user selects the Kanji symbol from the list of candidates.

Figure 7:
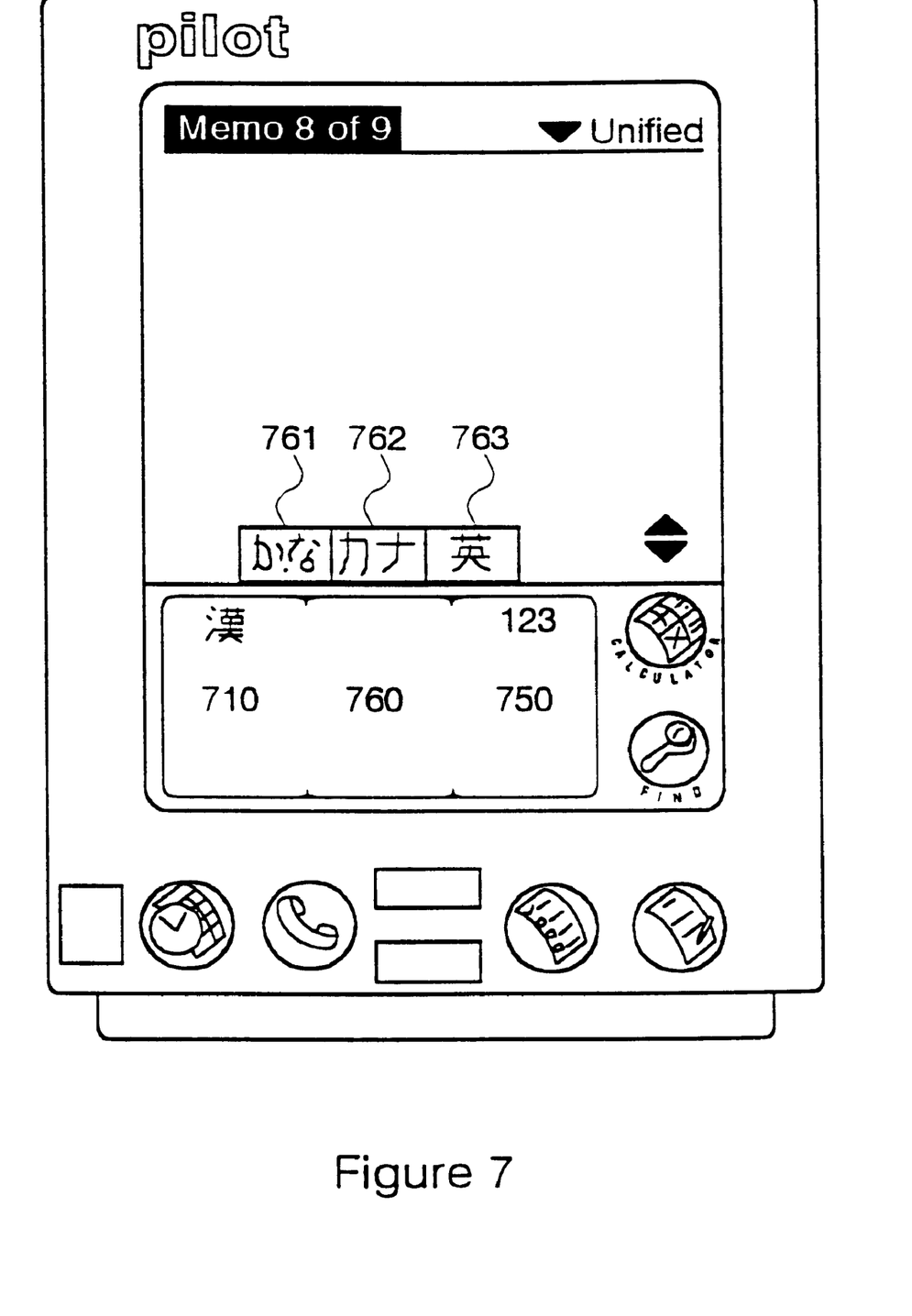
FIG. 7 illustrates a first embodiment of a pen-based computer system that recognizes Japanese writing using combined input box.
Figure 8:
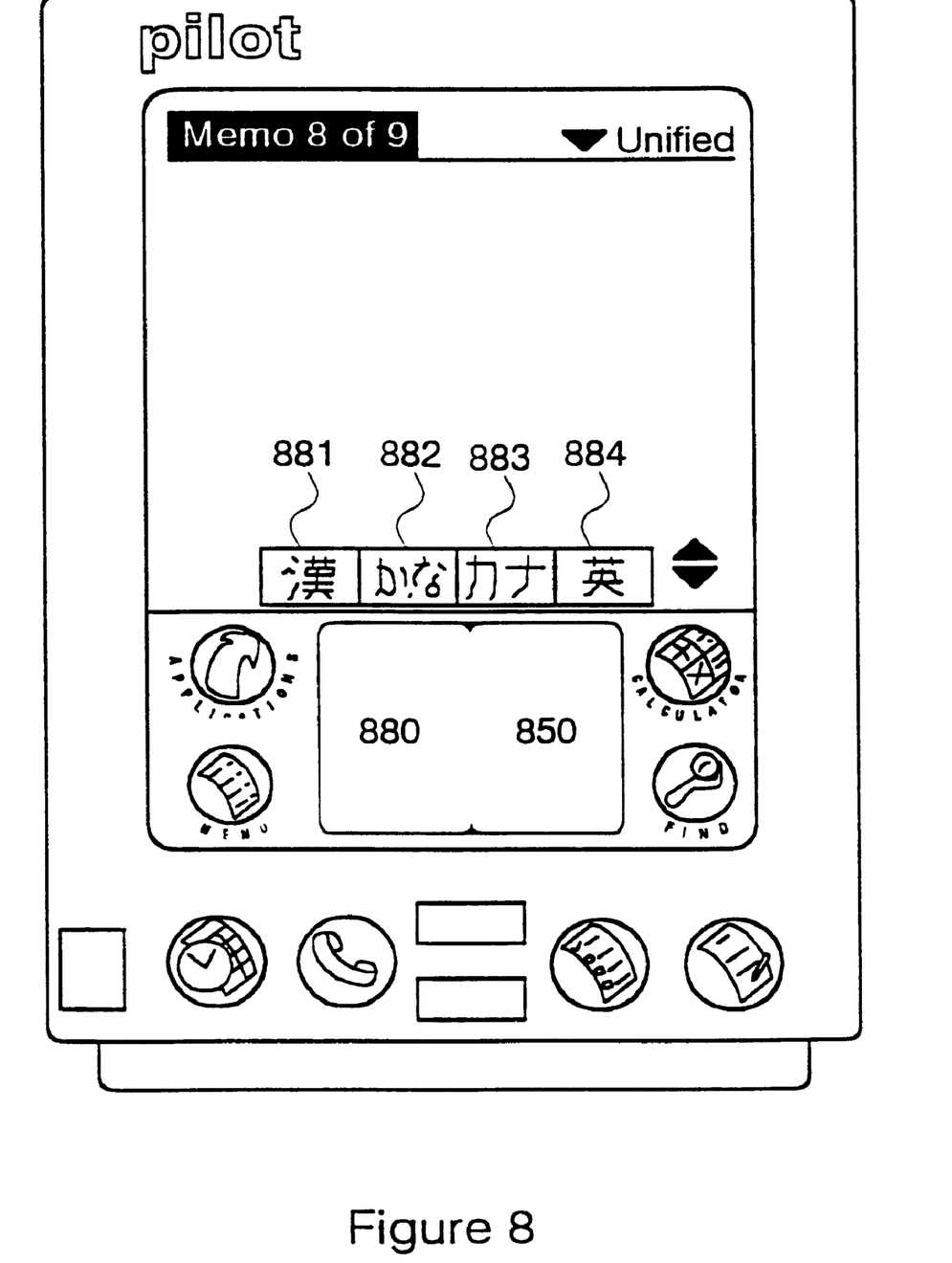
FIG. 8 illustrates a first embodiment of a pen-based computer system that recognizes Japanese writing using combined input box.

The techniques of using "mode strokes" or "mode boxes" to switch between character sets and using separate character input boxes to switch between different character sets can both be used in combination. FIG. 7 and FIG. 8 each illustrate an embodiment that combines the use of "mode boxes" and separate character boxes.

Referring to FIG. 7, an input system using three different character input boxes is illustrated. The leftmost character box is the Kanji input box 710. As previously described, the Kanji symbol set is very large and the characters are complex such that a dedicated Kanji recognition system is likely require. The rightmost character input box is the Arabic numeral input box 750. The Arabic numeral input box immediately recognizes Arabic numerals. The center box is a combined Hiragana, Katakana, and Roman character input box 760. The combined input box 760 attempts to recognize Hiragana, Katakana, or Roman characters depending on the current mode. The mode of the combined input box 760 is set using the Hiragana mode box 761, the Katakana mode box 761, and the Roman mode box 761. To switch between input modes, the user taps the stylus on the proper mode box. A single recognition system may be used for the combined input box 760 except that a different stroke and character data sets are used depending on the current mode.

FIG. 8 illustrates an embodiment with only two character input boxes. In the embodiment of FIG. 8, a combined input box 880 is used to recognize Kanji symbols, Hiragana characters, Katakana characters, or Roman characters. Similar to the embodiment of FIG. 7, the combined input box 880 attempts to recognize the user's writing depending on which of the mode boxes has been selected. In FIG. 8, there is a Kanji mode box 881, a Hiragana mode box 882, a Katakana mode box 883, and a Roman mode box 884. As illustrated with FIGS. 5, 7, and 8, many different permutations exist for the types of input boxes and the types of character recognition systems used.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A computer implement method of inputting information into a palmtop computer system, the palmtop computer system having a housing and a display screen accessible on the housing, the method comprising:

detecting a user input stroke entered onto one of a first handwriting input area or a second handwriting input area, the first handwriting input area and the second handwriting input area being provided on the display screen;

translating the user input stroke as a character from one of a set of alphabet characters or a set of number characters in response to the user input stroke being entered onto one of the first handwriting input area or the second handwriting input area, wherein the step of translating the user input stroke includes translating the user input stroke as an alphabet character in response to detecting the stroke being entered onto the first handwriting input area, and wherein the step of translating the user input stroke includes translating the user input stroke as a number character in response to detecting the stroke being entered onto the second handwriting input area; and immediately displaying the character translated from one of the set of alphabet characters or the set of number characters automatically after translating the user input stroke, so that the character is displayed prior to a subsequent user input stroke being detectable.

2. A computer implement method of inputting information into a palmtop computer system, the palmtop computer system having a housing and a display screen accessible on the housing, the method comprising:

detecting a user input stroke entered onto one of a first handwriting input area or a second handwriting input area, the first handwriting input area and the second handwriting input area being provided on the display screen;

performing at least one of the following steps of translating the user input stroke:

translating the user input stroke as a character from a first character set in response to detecting that the user input stroke is entered onto the first handwriting input area;

translating the user input stroke as a character from a second character set in response to detecting that the user input stroke is entered onto the second handwriting input area; and displaying the character translated from one of the first character set or the second character set automatically after translating the user input stroke, so that the character is displayed prior to a user being able to enter a subsequent user input stroke onto one of the first handwriting input area or the second handwriting area.

3. The method of claim 2, wherein translating the user input stroke as a character from a first character set includes translating the character from the set comprising the Roman alphabet.

4. The method of claim 3, wherein translating the user input stroke as a character from a second character set includes translating the character from the set comprising Arabic numerals.

5. The method of claim 2, wherein translating the user input stroke includes recognizing the character as being from one of the first character set or from the second character set immediately after a mechanism used to create the user input stroke is lifted off of the display screen.

6. A palmtop computer system comprising:

a housing;

a contact-sensitive display screen accessible on the housing, the display screen providing a first handwriting input area forming a first subarea of the display screen, and a second handwriting input area forming a second subarea of the display screen; and a processor configured to translate a user input stroke entered onto the first handwriting input area as a character from a first character set, and to interpret a user input stroke entered onto the second handwriting input area as a character from a second character set; and wherein the processor is configured to immediately display the character interpreted from the user input stroke on the display screen in response to interpreting the character from one of the first character set or the second character set, wherein the processor is configured to that the character is displayed before a user is capable of entering a subsequent user input stroke.

7. The palmtop computer system of claim 6, wherein said first character set comprises Roman alphabet characters.

8. The palmtop computer system of claim 7 wherein said second character set comprises Arabic numerals.

9. The palmtop computer system of claim 6 wherein the processor interprets the user input stroke immediately after the user input stroke is completed.

10. The palmtop computer system of claim 6, wherein the display screen includes a digitizer pad coupled to the processor to detect contact by an object to the play screen.

11. The palmtop computer system of claim 10, wherein the digitizer pad extends beyond a screen of the display screen to form a handwriting recognition portion, the handwriting recognition portion containing the first subarea and the second subarea.

12. The method of claim 1, wherein translating the user input stroke includes recognizing the character as being from one of the set of alphabet characters or number characters immediately after the user input stroke is completed.

* * * * *